United States Patent [19]

Bell

[11] Patent Number: 4,747,641

[45] Date of Patent: May 31, 1988

[54] SEAT RECLINER MECHANISM

[75] Inventor: Robert L. Bell, Rochester Hills, Mich.

[73] Assignee: Fisher Dynamics Corporation, St. Clair Shores, Mich.

[21] Appl. No.: 89,722

[22] Filed: Aug. 26, 1987

[51] Int. Cl.$^4$ .............................................. B60N 1/02
[52] U.S. Cl. .................................. 297/379; 297/366; 297/367
[58] Field of Search .................. 297/379, 366, 367

[56] References Cited

U.S. PATENT DOCUMENTS

| | | | |
|---|---|---|---|
| 4,223,946 | 9/1980 | Kluting | 297/367 |
| 4,314,729 | 2/1982 | Kluting | 297/379 |
| 4,355,846 | 10/1982 | Kluting et al. | 297/366 |
| 4,423,904 | 1/1984 | Crawford | 297/366 X |
| 4,579,387 | 4/1986 | Bell | 297/379 |
| 4,634,182 | 1/1987 | Tanaka | 297/379 |
| 4,707,010 | 11/1987 | Croft et al. | 297/379 |

FOREIGN PATENT DOCUMENTS 2641587  3/1978  Fed. Rep. of Germany ...... 297/379

Primary Examiner—James T. McCall
Attorney, Agent, or Firm—Harness, Dickey & Pierce

[57] ABSTRACT

A seat recliner mechanism for a motor vehicle of the type which permits forward folding of the seat back and allows the reclined position of the seat back to be adjusted. In one type of recliner mechanism, a quadrant is provided having a curved toothed rack which meshes with a rotatable recliner gear. An adjusting mechanism acts on the recliner gear for either preventing or allowing the recliner gear to rotate, thus providing a means for adjusting the reclined position. These types of mechanisms are subject to severe loadings if the recliner is placed in a rearwardly adjusted position with the seat back folded forward, and the actuation mechanism released. In this condition, the recliner spring which acts on the quadrant or recliner gear rotates these components unopposed by the mass of the upper recliner structure. When these components read their extreme positions, severe loadings are imposed upon them. In accordance with this invention, a pawl is provided which is movable to engage with a fixed arresting rack. When the seat back is folded forwardly, the pawl engages with the arresting rack and if the recliner release mechanism is then actuated, the quadrant motion is arrested by the pawl and rack, thus preventing unrestrained movement of the rack.

10 Claims, 2 Drawing Sheets

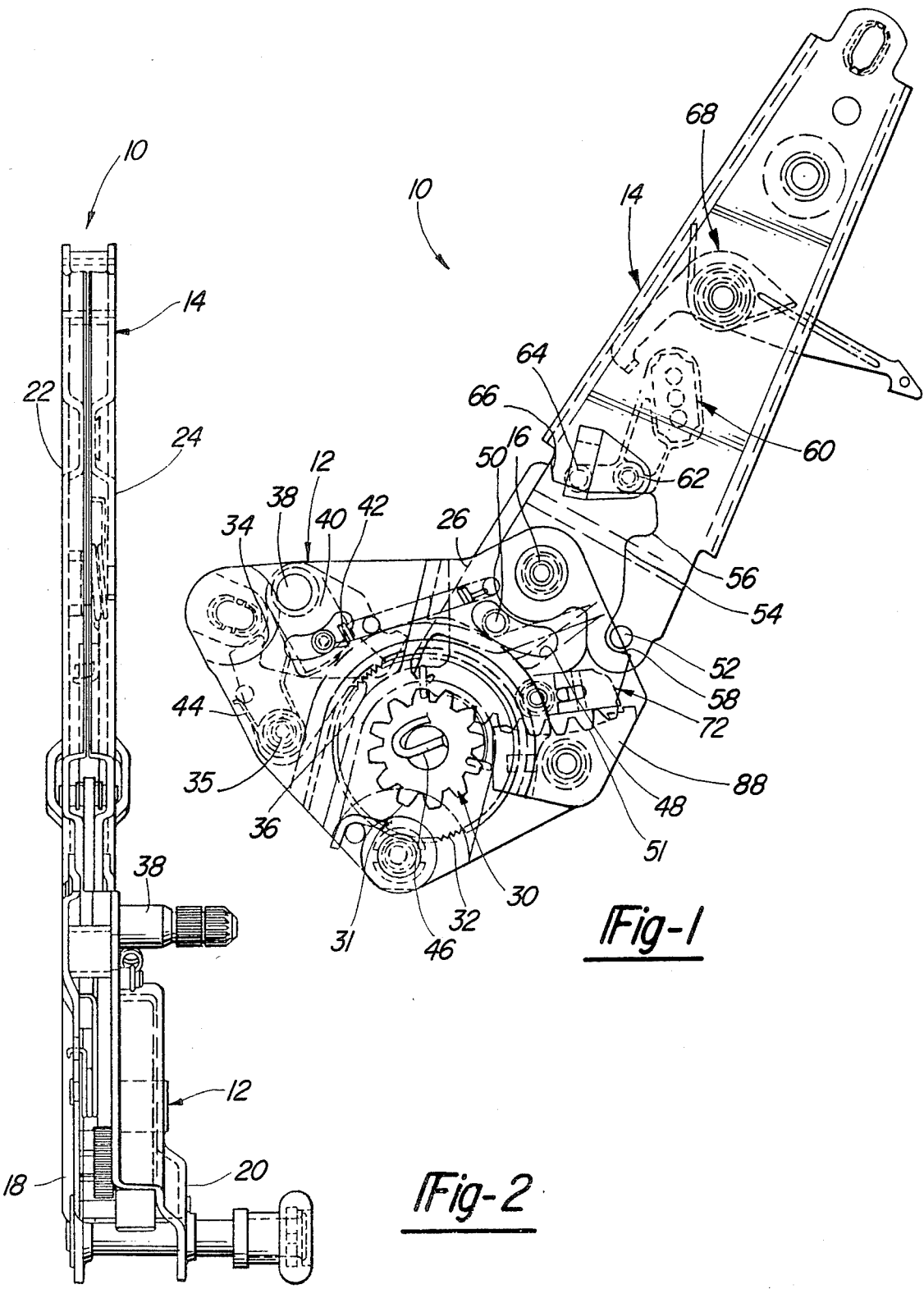

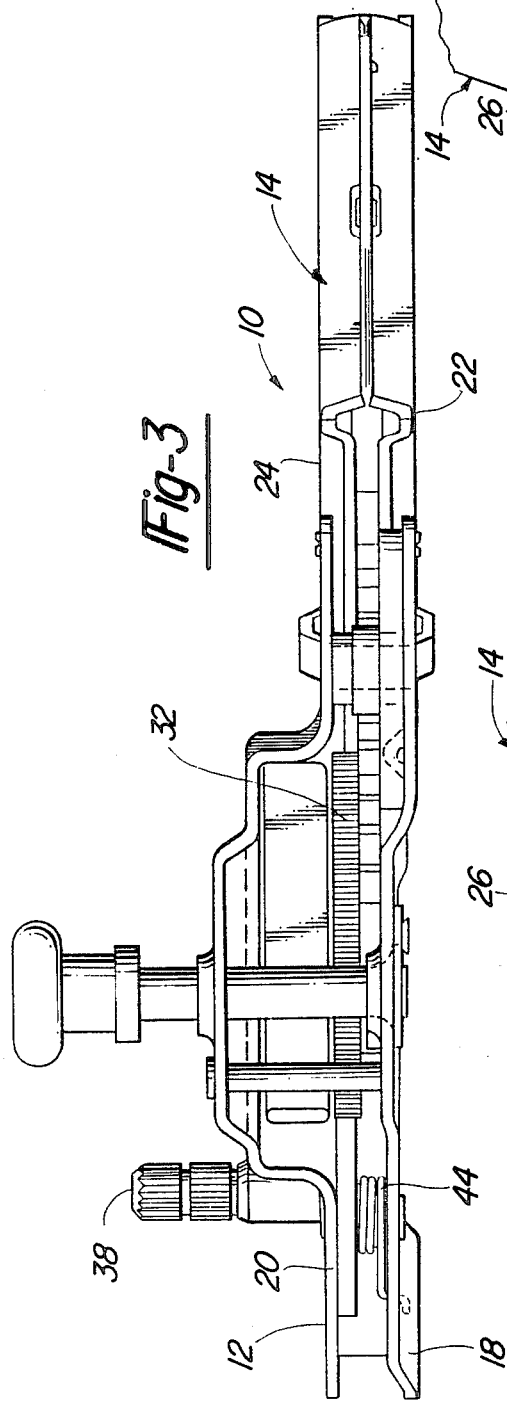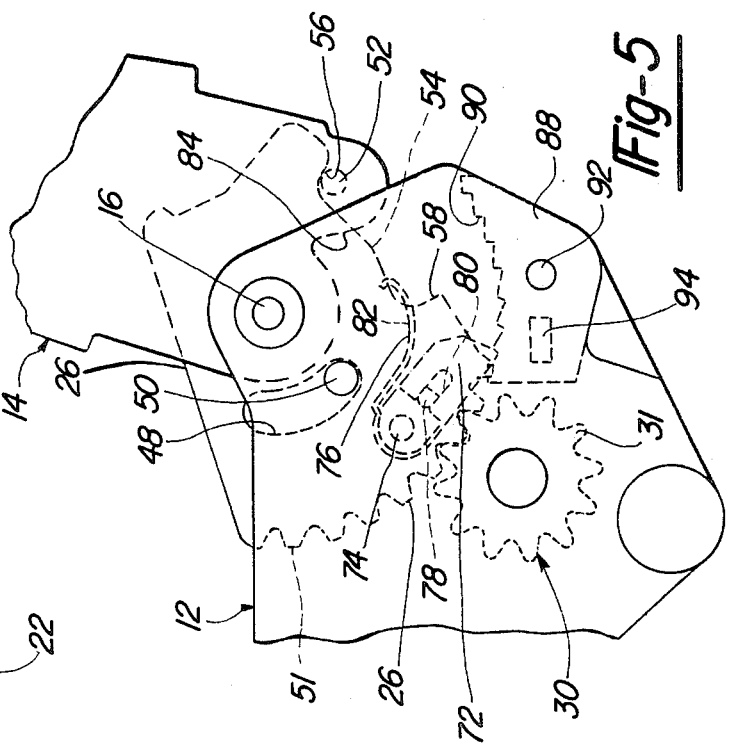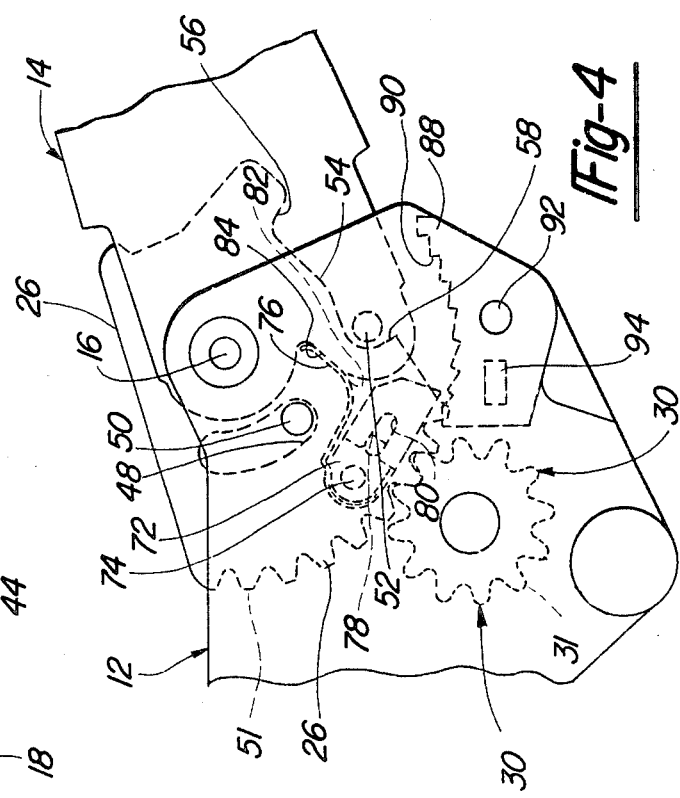

SEAT RECLINER MECHANISM

BACKGROUND AND SUMMARY OF THE INVENTION

This invention relates to a seat recliner mechanism and more particularly to one adapted for motor vehicle applications in which the seat back can be reclined to various positions and also folded forward to permit access to the rear compartment area of the vehicle.

Many motor vehicle seats are now provided with recliner mechanisms which allow the position of the seat back with respect to the seat bottom to be adjusted as a means of enchancing occupant comfort and convenience. In installations where access to a rear compartment area of the vehicle requires the front seat back to be tilted forward, for example in typical two-door style passenger cars, the seat back reclining mechanism must also provide lost motion for such forward folding.

In one type of seat recliner mechanism presently in widespread use, a lower recliner structure supports the seat bottom and an upper recliner structure supports the seat back. A rotatable recliner gear is carried by one of the recliner portions (typically the lower), and a quadrant is provided having an arcuate toothed surface which meshes with the gear. The quadrant interacts with the other recliner structure to establish the reclined angle. By fixing or allowing rotation of the recliner gear, the reclined position of the seat can be adjusted or fixed as desired. As a means of increasing the ease of establishing a desired reclined position, a spring is provided which exerts a torsional force on the recliner gear or directly on the quadrant. This spring causes the seat back to be urged toward the driver, enabling the reclined position to be adjusted by releasing the recliner mechanism and varying the force that the occupant exerts against the seat back.

The recliner quadrant further includes features which provide for a predetermined range of lost motion between the quadrant and one of the recliner structures (typically the upper). This lost motion provides forward folding capability to permit access to the rear compartment area of the vehicle without releasing the recliner or changing the reclined position setting.

For recliner mechanisms of the type described above, there is a particular mode of operation which imposes extreme and potentially damaging stresses on the recliner components. If the seat back is folded forward while the recliner is set at a rearwardly reclined position and the recliner is then released, the recliner spring will cause the quadrant to be rotated in a no-load condition. Once the quadrant reaches the end of its travel, enormous shock loads are placed on the mechanism since the quadrant and recliner gear are accelerated to a high angular velocity and arrested almost instantly. Although the above operational scenario is quite unusual in actual field use since operators seldom actuate the recliner release unless they are sitting in the seat, seat mechanism designers must nonetheless accommodate this condition.

In accordance with the present invention, a recliner mechanism is provided which has features for preventing unrestrained rotation of the quadrant when the seat back is in a folded forward position. The mechanism includes a restraint pawl with a lever attached to it which detects the position of the upper recliner structure, and when the seat is folded forward, the pawl is allowed to fall into engagement with a stationary toothed arresting rack. When the pawl engages the rack, movement of the quadrant is restrained. However, when the seat back is folded rearwardly to its normal position, the pawl is moved out of engagement with the rack, thus permitting normal recliner operation.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 1 is a side elevational view of a seat recliner mechanism in accordance with the present invention shown with the upper recliner structure positioned in a normal driving position.

FIG. 2 is a front elevational view of the seat recliner mechanism shown in FIG. 1.

FIG. 3 is a bottom view of the seat recliner mechanism shown in FIG. 1.

FIG. 4 is a partial side elevational view showing the seat recliner mechanism according to this invention adjusted to a rearwardly reclined position.

FIG. 5 is a partial side elevational view of the recliner mechanism with the quadrant in a rearwardly reclined position and the upper recliner structure in a folded forward position.

DETAILED DESCRIPTION OF THE INVENTION

A motor vehicle seat recliner mechanism according to the present invention is shown in each of the figures and is generally designated by reference number 10. Recliner mechanism 10 as shown is intended to be positioned at the front left-hand (driver's) side of a motor vehicle. A seat recliner mechanism which is a mirror image of the embodiment illustrated could be used for the right-hand (passenger) side of the vehicle.

Seat recliner mechanism 10 includes a lower recliner structure 12 which becomes attached to a seat bottom frame (not shown). Upper recliner structure 14 attaches to a seat back frame (not shown) and is adapted to pivot with respect to lower structure 12 about pivot pin 16. Lower recliner structure 12 is fabricated by attaching two plates, inner lower recliner plate 18 and outer lower recliner plate 20. These plates are attached together by rivets or by welding and define a space therebetween which accommodates additional components which are described below. In a similar manner, upper recliner structure 14 is fabricated by attaching inner upper recliner plate 22 and outer upper recliner plate 24.

The rotated position of recliner gear 30 and consequently the reclined position of the seat back with respect to the seat bottom is controlled through an actuation mechanism which permits recliner gear 30 to be freely rotatable to permit the reclined position to change, or fixed to set a desired reclined position. Recliner gear 30 includes gear portion 31 and an enlarged diameter toothed portion 32. Braking pawl 34 is rotatable about pivot 35 and includes a toothed surface 36 engagable with gear toothed portion 32. Actuation shaft 38 carries an actuation handle (not shown) which causes cam 40 to be rotated. Cam 40 has cam surface 42 which acts on pawl 34 to force it into engagement with gear toothed portion 32, or permits it to be withdrawn from such engagement. Spring 44 urges the pawl 34 toward the released position so that the pawl moves out of engagement with gear portion 32 when the actuation handle is released.

Quadrant 26 is pinned for rotation with respect to lower and upper recliner structures 12 and 14 about pivot pin 16, and includes an arcuate slot 48 which receives pin 50 attached to lower recliner structure 12. Toothed rack 51, is formed along the lower edge of quadrant and meshes with recliner gear portion 31. Slot 48 and pin 50 establish an angular range of adjustment of the reclined position of the seat back. In operation, upper recliner structure 14 is normally maintained in a fixed position since pawl 34 prevents rotation of gear 30. When the release handle is actuated, gear 30 can be rotated to allow changes in reclined position.

FIGS. 4 and 5 show quadrant 26 in a position of supporting the seat back in a fully reclined rearward position. Torsion spring 46 shown in FIG. 1 engages lower recliner structure 12 and recliner gear 30, and exerts a torsional force on the recliner gear so that, when the actuation handle is released, upper recliner structure 14 biases the seat back against the occupant. This feature enables the reclined position of the seat back to be adjusted by changing the force exerted against the seat back when the recliner release handle is actuated.

Recliner mechanism 10 is designed for use in two-door style vehicles or other vehicles where there is a need to fold the seat back forward to access a rear compartment area. Accordingly, a predetermined degree of lost motion of the seat back is provided for such forward folding. In accordance with the embodiments described herein, such lost motion is provided by pin 52 affixed to upper recliner structure 14 which travels within an open arcuate slot 54 formed by quadrant 26. Arcuate slot 54 forms end walls 56 and 58. FIG. 4 illustrates the seat back in a normal rearward folded position with pin 52 engaging wall 58, whereas FIG. 5 shows the seat back in a forward folded position in which the pin engages wall 56.

Recliner mechanism 10 as shown in FIG. 1 includes an inertia sensitive actuation mechanism. Pendulum 60 is rotatable about pin 62 and carries engaging rod 64. When pendulum 60 is subjected to vehicle deceleration forces above a predetermined level, rod 64 is positioned in engagement with quadrant stop surface 66, thus preventing forward folding of the seat back in such conditions. Under normal conditions, however, the seat back may be freely folded forward. Release lever 68 causes pendulum 60 to be moved to a disengaging position in emergency conditions where escape from the vehicle may be necessary.

For recliner mechanism 10 of the type described above, there is a particular operating condition which can impose severe loads on the recliner mechanism. This operating condition is illustrated in FIG. 5 in which the seat back and quadrant 26 are positioned in a rearwardly reclined position, and upper recliner structure 14 is rotated in to a forward folded position. In this configuration, if the recliner release handle is actuated, the full force of torsion spring 46 acts on recliner gear 30 and quadrant 26 without significant resistance. Recliner gear 30 accelerates very rapidly and causes the quadrant to rotate to its counterclockwise extreme position defined by slot 48 and pin 50, where it stops abruptly. This operation imposes extreme shock loads on quadrant 26, recliner gear 30 and their associated mechanisms. In accordance with the present invention, means are provided for preventing such unrestrained movement of recliner gear 30 and quadrant 26.

As best shown in FIG. 4, restraint pawl 72 is carried by quadrant 26 for rotation about pin 74. Leaf spring lever 76 is carried by pawl 74 and includes protruding end 82 and tab 78 interfitting with pawl slot 80. Upper recliner structure 14 has a lower edge configured to form cam surface 84. When upper recliner structure 14 is in its rearward folded position, as shown in FIG. 4, cam surface 84 engages leaf spring lever end 82 causing pawl 72 to be moved counterclockwise. Conversely, when upper recliner structure 14 is rotated forwardly, there is no engagement between leaf spring lever end 82 and cam surface 84, and due to the position of the center of gravity of pawl 72 (horizontally displaced to the right from pin 74) the pawl rotates to the clockwise position shown in FIG. 5.

Arresting rack 88 includes an arc-shaped toothed surface 90 and is fixedly positioned and attached to lower recliner structure 12 by pin 92 and lug 94. Arresting rack 88 is positioned to engage pawl 72 when it is in its clockwise rotated position, but clear such engagement when the pawl is rotated to its counterclockwise rotated position.

FIGS. 4 and 5 illustrate operation of restraint pawl 72 with respect to arresting rack 88. In FIG. 4, upper recliner structure 14 is in its normal rearward folded position. In this configuration, operation of recliner mechanism 10 proceeds in the ordinary manner, in which release of the actuation handle permits the reclined position to be adjusted within the range established by slot 48 and pin 50. In this operating condition, the biasing force applied by torsion spring 46 acts against the mass of the entire seat back and upper recliner structure 14, and is further resisted by the occupant's upper torso acting against the seat back cushion. In this condition, changes in reclined position occur relatively gradually and loads on recliner gear 30 quadrant 26 and their associated mechanisms are manageable.

In FIG. 5, quadrant 26 is positioned in a rearwardly reclined position and upper recliner structure 14 is folded forward. In this operating condition, the weight of the seat back and upper recliner structure 14 do not resist the torque applied by torsion spring 46. Since upper recliner structure cam surface 84 is not acting on leaf spring lever end 82, pawl 74 is permitted to fall into engagement with arresting rack 88. In this condition, if the release handle is actuated, quadrant 26 is not permitted to freely rotate in response to the torsional force applied by spring 46. Instead, quadrant 26 rotates only until pawl 72 engages one of the teeth of arresting rack 88. When upper recliner structure 14 is returned to its normal folded back position, pawl 72 is urged in a counterclockwise direction out of engagement with arresting rack 88. Immediate movement of pawl 72 out of engagement with rack 88 may not occur since the pawl "bites" into a tooth of the rack. However, as soon as the actuating handle is released and the seat back is moved rearwardly, pawl 72 disengages rack 88 under the influence of spring lever 76. Accordingly, this invention provides a means for preventing severe loadings from being applied to the recliner mechanism in a condition wherein the biasing force applied by the recliner spring is unopposed.

While the above description constitutes the preferred embodiments of the present invention, it will be appreciated that the invention is susceptible to modification, variation and change without departing from the proper scope and fair meaning of the accompanying claims.

I claim:

1. A seat recliner mechanism of the type enabling the reclined angle between a seat back and seat bottom to be adjusted and further enabling the seat back to be folded forwardly without changing the reclined angle comprising:

an upper recliner structure for supporting the seat back;

a lower recliner structure for supporting the seat bottom;

a pivot connecting said upper and lower recliner structures enabling said recliner structures to be rotated with respect to each other;

a quadrant having engaging means for establishing the reclined position of the seat back;

recliner actuation means acting on the quadrant and movable from a released position disengaged from said quadrant for enabling the reclined angle to be varied, to a normal position engaged with said quadrant fixing the reclined angle;

seat folding means for enabling said upper recliner structure to be folded forwardly through a predetermined range without requiring said quadrant to be moved;

a pawl movable between a first and second position;

means for sensing the folded position of said upper recliner structure wherein said pawl is urged to said first position when said upper recliner structure is folded forwardly and moved to said second position when said upper recliner structure is folded rearwardly; and an arresting rack engagable with said pawl when said pawl is in said first position whereby when said upper recliner structure is folded forwardly, rotation of said quadrant will be inhibited in the event that said recliner actuation means is moved to said released position.

2. A seat recliner mechanism defined in claim 1 further comprising spring means coupled to said quadrant for urging said quadrant so as to urge said upper recliner structure toward a forward reclined angle position.

3. A seat recliner mechanism defined in claim 1 wherein said quadrant is rotatable about said pivot.

4. A seat recliner mechanism defined in claim 3 wherein said pawl is rotatably carried by said quadrant and said arresting rack is affixed to said lower recliner structure.

5. A seat recliner mechanism defined in claim 3 wherein said means for sensing comprises a leaf spring element coupled to said pawl and engagable with a cam surface formed by said upper recliner structure.

6. A seat recliner mechanism defined in claim 3 wherein said quadrant further defines a curved toothed rack engagable with a rotatable recliner gear, said recliner actuation means acting on said recliner gear to restrict rotation of said recliner gear thus fixing said reclined angle or permitting rotation of said recliner gear thereby allowing the reclined angle to be adjusted.

7. A seat recliner mechanism defined in claim 3 wherein said seat folding means comprises an arcuate slot formed by said quadrant and a pin affixed to said upper recliner structure movable within said arcuate slot such that during seat folding, said pin travels within said slot and said upper recliner structure can be moved without causing said quadrant to be rotated with respect to said lower recliner structure.

8. A seat recliner mechanism of the type enabling the reclined angle between a seat back and seat bottom to be adjusted and further enabling the seat back to be folded forwardly without changing the reclined angle comprising:

an upper recliner structure for supporting the seat back;

a lower recliner structure for supporting the seat bottom;

a first pivot connecting said upper and lower recliner structures enabling said structures to be rotated relative to each other;

a quadrant rotatable about said first pivot and having a toothed surface, said quadrant coupled to said upper recliner structure to establish the reclined angle;

a recliner gear rotatably affixed to said lower recliner structure and meshing with said toothed rack;

recliner actuation means movable from a released position enabling said recliner gear to be rotated thereby allowing said reclined position to be adjusted, to a normal position restraining rotation of said recliner gear and thereby fixing the reclined angle;

spring means coupled to said quadrant for urging said quadrant in a manner to urge said upper recliner structure toward a forward reclined position;

seat folding means enabling said upper recliner structure to be folded forwardly through a predetermined range without causing said quadrant to be rotated;

a pawl carried for rotation about a second pivot by said quadrant and movable between a first and second rotated position;

lever means coupled to said pawl and engagable with a cam surface of said upper recliner structure such that said pawl is urged toward said first position when said upper recliner structure is folded rearwardly, and urged toward said second position when said upper recliner structure is folded forwardly; and an arresting rack affixed to said lower recliner structure having a toothed surface engagable with said pawl when said pawl is in said second position whereby when said upper recliner structure is folded forwardly, rotation of said quadrant in response to biasing applied by said spring means is restricted even in the event that said recliner mechanism is released, and when said recliner structure is folded rearwardly, said pawl is urged to a position of disengagement with said arresting rack thereby allowing said reclined angle to be adjusted upon release of said recliner actuation means.

9. A seat recliner mechanism defined in claim 8 wherein said lever means comprises a leaf spring element coupled to said pawl and engagable said cam surface.

10. A seat recliner mechanism defined in claim 8 wherein said seat folding means comprises an arcuate slot formed by said quadrant and a pin affixed to said upper recliner structure movable within said arcuate slot such that during seat folding, said upper recliner structure can be moved without causing said quadrant to be rotated with respect to said lower recliner structure.

* * * * *

UNITED STATES PATENT AND TRADEMARK OFFICE
CERTIFICATE OF CORRECTION

PATENT NO. : 4,747,641
DATED : May 31, 1988
INVENTOR(S) : Robert L. Bell

It is certified that error appears in the above-identified patent and that said Letters Patent is hereby corrected as shown below:

Column 6, line 45, claim 8, after "structure" insert --and--.

Column 6, line 58, claim 9, after "engagable" insert --with--.

Signed and Sealed this

Twenty-second Day of November, 1988

Attest:

DONALD J. QUIGG

*Attesting Officer*   *Commissioner of Patents and Trademarks*